United States Patent
Parrondo et al.

(10) Patent No.: US 12,451,514 B2
(45) Date of Patent: Oct. 21, 2025

(54) LAYERED SOLID-STATE LITHIUM BATTERY

(71) Applicant: Nissan North America, Inc., Franklin, TN (US)

(72) Inventors: Javier Parrondo, Novi, MI (US); Cenk Gumeci, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 742 days.

(21) Appl. No.: 17/678,534

(22) Filed: Feb. 23, 2022

(65) Prior Publication Data

US 2023/0268548 A1 Aug. 24, 2023

(51) Int. Cl.
| | |
|---|---|
| *H01M 10/0562* | (2010.01) |
| *H01M 4/134* | (2010.01) |
| *H01M 4/36* | (2006.01) |
| *H01M 4/38* | (2006.01) |
| *H01M 10/0525* | (2010.01) |
| *H01M 4/02* | (2006.01) |

(52) U.S. Cl.
CPC ....... *H01M 10/0562* (2013.01); *H01M 4/134* (2013.01); *H01M 4/366* (2013.01); *H01M 4/382* (2013.01); *H01M 10/0525* (2013.01); *H01M 2004/021* (2013.01); *H01M 2300/0068* (2013.01); *H01M 2300/0094* (2013.01)

(58) Field of Classification Search
CPC .. H01M 10/0562; H01M 4/134; H01M 4/366; H01M 4/382; H01M 10/0525; H01M 2004/021; H01M 2300/0068; H01M 2300/0094; H01M 4/62; H01M 4/625; H01M 2004/027; H01M 2300/0082; H01M 4/661; H01M 10/052; Y02E 60/10

See application file for complete search history.

(56) References Cited

U.S. PATENT DOCUMENTS 10,566,656 B2 * 2/2020 Kim ................... H01M 10/052
10,593,937 B2 3/2020 Jeong et al.
(Continued)

FOREIGN PATENT DOCUMENTS

CN 110867562 A 3/2020
EP 2230706 A1 9/2010
(Continued)

OTHER PUBLICATIONS

Wen Lu et al., Lithium-ion batteries based on vertically-aligned carbon nanotube electrodes and ionic liquid electrolytes, Phys. Chem. Chem. Phys., 2012, 14, 12099-12104 (Year: 2012).*

(Continued)

*Primary Examiner* — Michael L Dignan
(74) *Attorney, Agent, or Firm* — Young Basile Hanlon & MacFarlane, P.C.

(57) ABSTRACT

An all-solid-state battery cell has a lithium metal anode layer, an anode protective layer in contact with the lithium metal anode layer, the anode protective layer comprising at least one metal, a first electrolyte layer in contact with the anode protective layer, a second electrolyte layer, an electrolyte interlayer comprising carbon and binder, the electrolyte interlayer positioned directly between the first electrolyte layer and the second electrolyte layer, and a cathode layer in contact with the second electrolyte layer.

20 Claims, 2 Drawing Sheets

(56) References Cited

U.S. PATENT DOCUMENTS

| | | | |
|---|---|---|---|
| 11,955,639 B2* | 4/2024 | Chen | H01M 4/134 |
| 2004/0023106 A1* | 2/2004 | Benson | H01M 10/0436 |
| | | | 429/126 |
| 2007/0048612 A1 | 3/2007 | Nakajima et al. | |
| 2012/0301778 A1* | 11/2012 | Trevey | H01M 4/386 |
| | | | 429/231.95 |
| 2013/0115519 A1* | 5/2013 | Lee | H01M 50/491 |
| | | | 429/251 |
| 2019/0267630 A1* | 8/2019 | Cho | H01M 4/62 |
| 2019/0305290 A1* | 10/2019 | Singh | H01M 4/625 |
| 2019/0393496 A1* | 12/2019 | He | H01M 4/134 |
| 2019/0393510 A1 | 12/2019 | He et al. | |
| 2020/0395631 A1 | 12/2020 | Kim et al. | |
| 2022/0158237 A1* | 5/2022 | Zhang | H01M 10/0565 |
| 2022/0302437 A1* | 9/2022 | Choi | H01M 4/62 |
| 2023/0137721 A1* | 5/2023 | Chang | H01M 4/625 |
| | | | 429/162 |
| 2023/0268547 A1* | 8/2023 | Su | H01M 10/0562 |
| | | | 429/306 |

FOREIGN PATENT DOCUMENTS

| | | |
|---|---|---|
| EP | 2455998 A1 | 5/2012 |
| EP | 2833466 A1 | 2/2015 |
| WO | 2020102362 A1 | 5/2020 |

OTHER PUBLICATIONS

Zhang et al. "Horizontal Growth of Lithium on Parallely Aligned MXene Layers towards Dendrite-Free Metallic Lithium Anodes." Adv. Mater. 2019, 31, 1901820 (Year: 2019).*

Liu et al. "Silver Nanoparticle-Doped 3D Porous Carbon Nanofibers as Separator Coating for Stable Lithium Metal Anodes." ACS Appl. Mater. Interfaces 2019, 11, 17843-17852 (Year: 2019).*

* cited by examiner

LAYERED SOLID-STATE LITHIUM BATTERY

TECHNICAL FIELD

This disclosure relates to solid-state lithium batteries incorporating a layer configured to suppress dendrite formation and reduce the required amount of lithium, and another layer configured to provide mechanical strength to the battery cell as well as improved ionic diffusion.

BACKGROUND

Advances have been made toward high energy density batteries, including both lithium metal and lithium-ion batteries. However, these advances are limited by the underlying choice of materials and electrochemistry. Traditional lithium-ion batteries either use organic liquid electrolytes, prone to negative reactions with active materials and potentially flammable, or ionic liquid electrolytes, with increased viscosities and lower ionic conductivity. All-solid-state batteries can address some or all of these issues, as well as produce higher energy densities. However, the large interfacial resistance at the electrolyte/electrode interface and the interfacial stability and compatibility due to lithium reactivity affect the electrochemical performance of batteries.

Non-uniform electrodeposition of lithium, which results in dendrites, is also holding back the widespread adoption of lithium metal batteries. During battery operation, lithium is continuously deposited and removed. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

SUMMARY

Disclosed herein are implementations of layered all-solid-state battery cells and batteries comprising a plurality of the cells.

An all-solid-state battery cell as disclosed herein has a lithium metal anode layer, an anode protective layer in contact with the lithium metal anode layer, the anode protective layer comprising at least one metal, a first electrolyte layer in contact with the anode protective layer, a second electrolyte layer, an electrolyte interlayer comprising carbon and binder, the electrolyte interlayer positioned directly between the first electrolyte layer and the second electrolyte layer, and a cathode layer in contact with the second electrolyte layer.

Another all-solid-state battery cell includes a lithium metal anode layer, an anode protective layer in contact with the lithium metal anode layer, the anode protective layer comprising metal particles, a first electrolyte layer in contact with the anode protective layer, a second electrolyte layer, an electrolyte interlayer comprising carbon nanotubes and binder, the carbon nanotubes aligned in a stacking direction, the electrolyte interlayer positioned directly between the first electrolyte layer and the second electrolyte layer, and a cathode layer in contact with the second electrolyte layer, wherein the first electrolyte layer has a greater thickness than a thickness of the second electrolyte layer.

Other implementations are contemplated based on the description of the cells herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

All-solid-state batteries (ASSBs) offer higher volumetric and gravimetric energy densities than conventional lithium-ion batteries. The lithium metal anode has a theoretical gravimetric capacity approximately ten times higher than graphite-based anodes. However, non-uniform electrodeposition of lithium, which results in dendrites, is holding back the widespread adoption of lithium metal batteries. During battery operation, lithium is continuously deposited or removed depending on charge/discharge cycles. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur. Contact between the solid electrolyte and the lithium metal can be lost, with gaps forming between the lithium and solid electrolyte. Both the low-density lithium dendrite deposition and the loss of contact between layers adds to the cell expansion during charging. As the lithium dendrites reach the other electrode, short circuiting of the battery can occur. Also, side reactions between lithium metal and the solid electrolyte can further contribute to the decrease in performance.

The layered ASSB cells disclosed herein provide ASSBs that provide a greater driving range and shorter charging time. These are achieved, in part, due to the synergistic effects of the particular layers of the disclosed ASSB cells, which impart improved mechanical strength, better ionic conductivity, improved contact at interfaces, and lower resistance, all resulting in a better performing ASSB.

Figure 1:
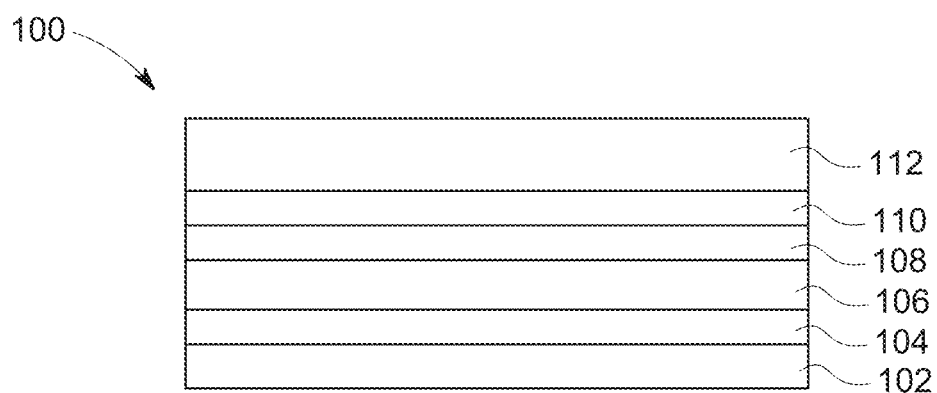
FIG. 1 is a schematic of an all-solid-state battery cell as disclosed herein.

An all-solid-state battery cell as disclosed herein is illustrated in FIG. 1. The ASSB cell 100 has a lithium metal anode layer 102 consisting of a layer of lithium metal about 10 μm to 50 μm in thickness and an anode protective layer 104 in direct contact with the lithium metal anode layer 102. A first electrolyte layer 106 is in direct contact with the anode protective layer 104. An electrolyte interlayer 108 comprising carbon and binder is positioned directly between the first electrolyte layer 106 and a second electrolyte layer 110. A cathode layer 112 is in direct contact with the second electrolyte layer 110. Lithium ions move from the cathode layer to the anode layer through the intermediate layers. Energy is stored and released as lithium ions travel between these electrodes through the electrolyte.

In conventional ASSB cells as well as lithium-ion battery cells using liquid electrolyte, lithium dendrites are formed when extra lithium ions accumulate on the anode surface and cannot be absorbed into the anode in time. Rather than being deposited evenly on the anode surface, the lithium metal deposits unevenly, forming dendrites. They can cause short circuits and lead to catastrophic failures. Capacity fade is another potential hazard of lithium dendrite growth.

The anode protective layer 104 disclosed herein reduces or prevents lithium metal dendrite growth. The anode protective layer 104 improves adhesion between the lithium metal anode layer 102 and the first electrolyte layer 106, reducing contact resistance and reducing or eliminating hot spots. By reducing or eliminating dendrite growth, the anode protective layer 102 reduces the anode thickness, and the overall battery volume, by up to 50%. The anode protective layer 102 also imparts greater mechanical strength to the ASSB cell.

The anode protective layer 104 comprises a base structure of a material defined herein, with one or more metals, in the form of particles or nano particles, dispersed through the base structure.

Figure 2:
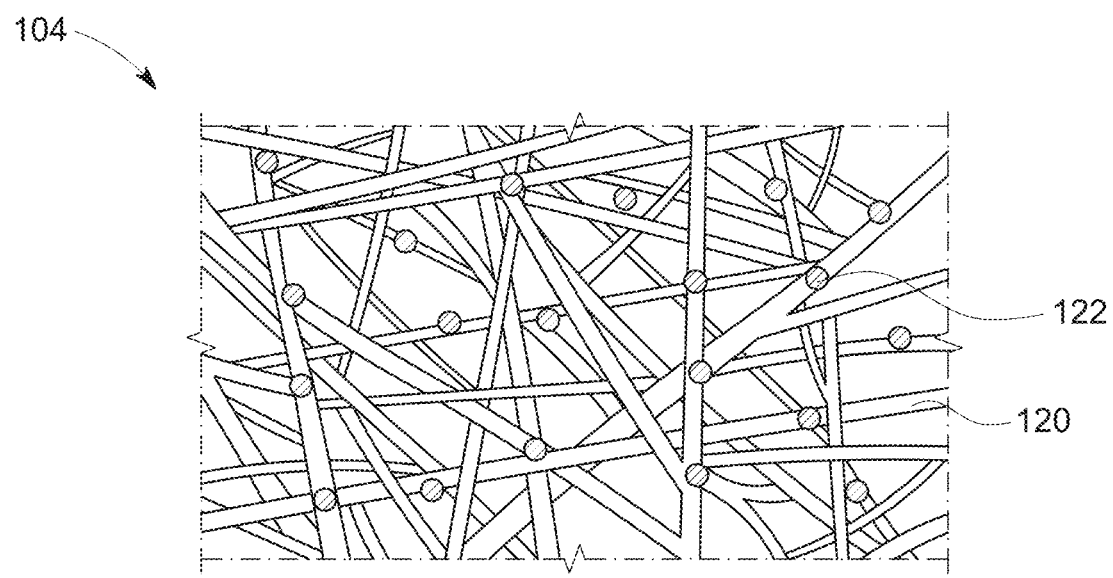
FIG. 2 is a schematic of an anode protective layer as disclosed herein.

In one implementation, the anode protective layer 104 may consist of a polymer base structure with metal particles dispersed throughout the polymer base structure. The polymer base structure can be polymer strands or fibers. For example, illustrated in FIG. 2, the polymer base structure 120 can be electrospun polymer and the metal particles 122 are dispersed in and supported on the electrospun polymer. The metal particles can be nanoparticles and can be one or more of Ag, AgCu, Au, Pt, PtNi, Pd, PdNi, PtCu$_3$, PdCu$_3$Ni, AuCu, Ni, and NiCu. The polymer can be one or more of nitrile-butadiene rubber (NBR), isobutylene-isoprene rubber (IIR), ethylene-propylene block copolymers, styrene-maleic anhydride block copolymers, urea-formaldehyde polymers, melamine-formaldehyde polymers, rayon, nylon, aramids, polyethylene terephthalate (PET), polybutylene terephthalate (PBT), polycarbonate (PC), polyacetal, polyphenylene oxide (PPO), polyetherketone (PEK), polyetheretherketone (PEEK), epoxy resins, polysiloxanes, polyphenylene sulfide (PPS), polysulfide rubber, polyurethane fibers, polyurethane elastomers, polyethylene (PE), polypropylene (PP), polystyrene (PS), polyvinyl chloride (PVC), polyvinylidene chloride (PVDC), polyvinyl acetate (PVAc), polyacrylonitrile (PAN), polymethyl methacrylate (PMMA), polymethyl acrylate, polyethyl acrylate, polyacrylate elastomers, silicone rubbers, polytetrafluoroethylene (PTFE), polyvinyl fluoride (PVF), polyvinylidene fluoride (PVDF), butadiene rubber (BR), chloroprene rubber (CR), polyisoprene rubber (IR), acrylonitrile-butadiene-styrene (ABS), styrene-butadiene rubber (SBR), and styrene-acrylonitrile (SAN).

In another implementation, the anode protective layer 104 can be carbon or graphene nanotubes forming a base structure, the base structure dispersed with metal particles. It is contemplated that the anode protective layer 104 consists only of the nanotubes and metal particles in some implementations. The metal particles can be nanoparticles and can be one or more of Ag, AgCu, Au, Pt, PtNi, Pd, PdNi, PtCu$_3$, PdCu$_3$Ni, AuCu, Ni, and NiCu.

In another implementation, the anode protective layer 104 can be a MXene. The MXene phases ($M_{n+1}AX_n$) can be as follows: M=Ti, V, Cr or NB; A=Al, Si, Sn, or In; n=any integer greater than zero; and X=C or N. $M_{n+1}X_n$ layers are interleaved with the A element, which is metallically bonded to the M element. M may be one or more of TI, V, Cr, and NB.

The anode protective layer 104 is a thin layer ranging between 5 μm and 10 μm. The anode protective layer 104 can be any combination of the implementations described herein.

The first electrolyte layer 106 consists of one or more solid electrolytes and a binder. The amount of binder is between 2 wt. % and 3 wt. % of the first electrolyte layer 106. The first electrolyte layer 106 has a thickness of between 20 μm and 50 μm. The first electrolyte layer 106 provides high ionic conductivity with the small amount of binder and provides mechanical strength to the cell with its thickness. The one or more solid electrolytes can be oxide-based electrolytes, and can include $Li_7La_3Zr_2O_{12}$, $Li_{6.75}La_3Zr_{1.75}Nb_{0.25}O_{12}$, $Li_{7.06}La_3Y_{0.06}Zr_{1.94}O_{12}$, $Li_{6.6}La_3Zr_{1.6}Sb_{0.4}O_{12}$, $Li_{6.28}Al_{0.24}La_3Zr_2O_{12}$, $Li_{5.9}Al_{0.2}La_3Zr_{1.75}W_{0.25}O_{12}$, $Li_{6.25}Ga_{0.25}La_3Zr_2O_{12}$, and $Li_{6.20}Ga_{0.30}La_{2.95}Rb_{0.05}Zr_2O_{12}$ as non-limiting examples.

The second electrolyte layer 110 consists of one or more solid electrolytes and a binder. The amount of binder is between 2 wt. % and 5 wt. % of the second electrolyte layer 110. Binder in either electrolyte layer can be one or more of PTFE, PVDF, styrene rubbers, polystyrene block copolymers, polyethylene and polystyrene. The first electrolyte layer 106 has less binder than the second electrolyte layer 110 to provide additional mechanical strength to the cell. The second electrolyte layer 110 has a thickness of between 10 μm and 20 μm and is thinner than the first electrolyte layer 106. The second electrolyte layer 110 improves the interface with the cathode layer 112 and improves ion transport across layers. It is contemplated that the first electrolyte layer 106 and the second electrolyte layer 110 can be formed of the same one or more solid electrolytes. The second electrolyte layer 110 can also be composed of different solid electrolytes, such as one or more sulfide-based electrolytes. As non-limiting examples, the sulfide-based electrolytes can be selected from the following: 60Li$_2$S·40P$_2$S$_5$ glass, 67Li$_2$S·33P$_2$S$_5$ glass, 70Li$_2$S·30P$_2$S$_5$ glass, 75Li$_2$S·25P$_2$S$_5$ glass, 80Li$_2$S·20P$_2$S$_5$ glass, 55(66Li$_2$S·33P$_2$S$_5$)·45LiI glass, 95(60Li$_2$S·40SiS$_2$)·5Li$_3$BO$_3$(Li$_3$AlO$_3$) glass, 77(75Li$_2$S·25P$_2$S$_5$)·33LiBH$_4$ glass, 40Li$_2$S·28SiS$_2$·30LiI glass, 30Li$_2$S·26B$_2$S$_3$·33LiI glass, Li$_7$P$_3$S$_{11}$, Li$_7$P$_3$S$_{11}$ analogue Li$_7$P$_{2.9}$S$_{10.85}$Mo$_{0.01}$, Li$_7$P$_3$S$_{11}$ analogue Li$_7$P$_{2.9}$Mn$_{0.1}$S$_{10.7}$I$_{0.3}$, Argyrodite Li$_6$PS$_5$Cl (cal.), Argyrodite Li$_6$PS$_5$Br (cal.), Argyrodite Li$_6$PS$_5$I (cal.), Argyrodite Li$_7$PS$_6$, Argyrodite Li$_7$Ge$_3$PS$_{12}$, Argyrodite Li$_{6.35}$P$_{0.65}$Si$_{0.35}$S$_5$Br, Argyrodite Li$_{6.6}$P$_{0.4}$Ge$_{0.6}$S$_5$I, Thio·LiSICON Li$_{3.25}$Ge$_{0.25}$P$_{0.75}$S$_4$, Thio·LiSICON analogue Li$_4$SnS$_4$, Thio·LiSICON analogue Li$_{11}$AlP$_2$S$_{12}$, Thio·LiSICON analogue Li$_{3.833}$Sn$_{0.833}$As$_{0.166}$S$_4$, Li$_{10}$GeP$_2$S$_{12}$, LGPS analogue Li$_{10}$SnP$_2$S$_{12}$, LGPS analogue Li$_{10}$SiP$_2$S$_{12}$, LGPS analogue Li$_{9.54}$Si$_{1.74}$P$_{1.44}$S$_{11.7}$Cl$_{0.3}$, 70Li$_2$S·30P$_2$S$_5$-1,4-butanediol, 75Li$_2$S·25P$_2$S$_5$-PFPE, 77.5Li$_2$S·22.5P$_2$S$_5$-methyl-imine, (PEO$_{18}$·LiTFSI)-LGPS (LGPS 1 wt. %), (PEO$_{18}$·LiTFSI)-LGPS (LGPS 1 wt. %)-SN (SN 10 wt. %), β-Li$_3$PS$_4$-LZNO (2 wt. %), β-Li$_3$PS$_4$—Al$_2$O$_3$(2 wt. %), β-Li$_3$PS$_4$—SiO$_2$ (2 wt. %), and β-Li$_3$PS$_4$-LLZO (30 wt. %).

The electrolyte interlayer 108 is directly between the first electrolyte layer 106 and the second electrolyte layer 110. The electrolyte interlayer 108 imparts mechanical strength to the ASSB cell 100 as well as increases ionic conductivity, improving ion diffusion from the cathode layer 112 to the anode layer 102. The electrolyte interlayer 108 comprises carbon and a binder. The amount of binder is between about 4 wt. % and 6 wt. % of the electrolyte layer 108. The electrolyte interlayer 108 may consist solely of carbon and binder. The carbon can be in the form of carbon nanotubes or carbon fiber. A hard, diamondlike carbon can be used. The electrolyte interlayer 108 is a highly porous layer and is about 10 μm in thickness.

Figure 3:
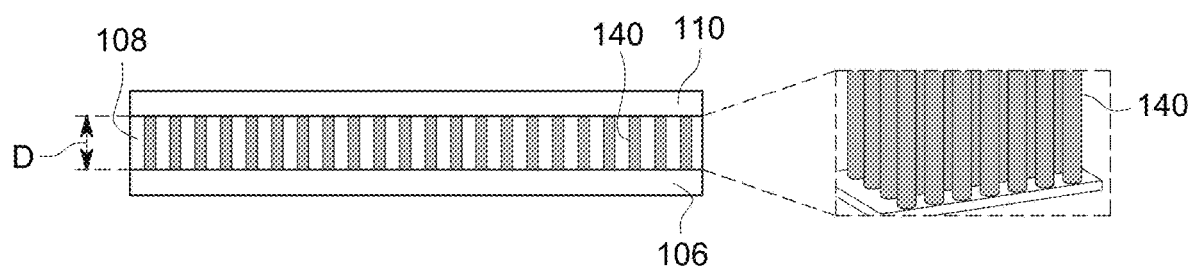
FIG. 3 is a schematic of an electrolyte interlayer as disclosed herein.
Figure 4:
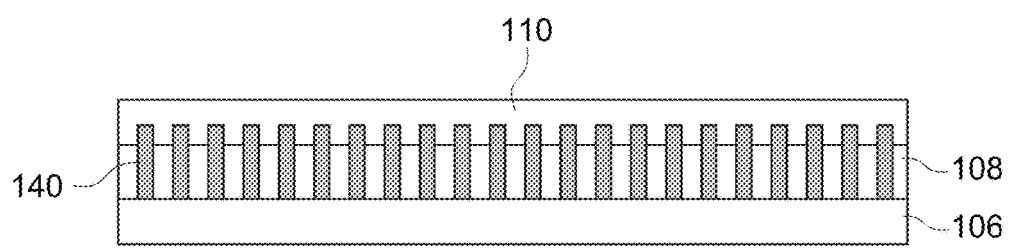
FIG. 4 is a schematic of another electrolyte interlayer as disclose herein.

In one implementation, the carbon in the electrolyte interlayer 108 is carbon nanotubes 140, illustrated in FIGS. 3 and 4. The carbon nanotubes 140 are themselves very porous, having very high surface area, and can also be hollow. To achieve the greatest increase in ion diffusion, the carbon nanotubes 140 may be aligned in a stacking direction D between the first electrolyte layer 106 and the second electrolyte layer 110. Alignment can be achieved through the use of magnets, as a non-limiting example. As illustrated in FIG. 3, the carbon nanotubes 140 may extend the thickness of the electrolyte interlayer 108, starting and ending at respective electrolyte layers. In another implementation, illustrated in FIG. 4, the carbon nanotubes 140 start at the interface of the first electrolyte layer 106 and the electrolyte interlayer 108, but extend into or are embedded in the second electrolyte layer 110, terminating within the second electrolyte layer 110.

The ASSB cell 100 includes the cathode layer 112, which comprises a cathode active material. The cathode active material comprises one or more electrochemically active cathode materials known for use in solid-state batteries, such as lithium-containing oxide (e.g., lithium cobalt oxide (Li-$CoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials. Other cathode active materials can be, but are not limited to, sulfur-based active materials including $LiSO_2$, $LiSO_2Cl_2$, $LiSOCl_2$, and $LiFeS_2$. The cathode active material can also include one or both of a carbon material for electron conductivity and solid-state electrolyte. A binder, such as a fiber, can also be included. As a non-limiting example, the cathode layer 112 can be a mixture of carbon, Li-NMC, a solid-state electrolyte and a fiber binder. The ratio of materials can be 80 Li-NMC/15 solid electrolyte/3 carbon/2 binder.

All of the layers of the ASSB cell 100 disclosed herein can be manufactured with little or no solvent, reducing manufacturing costs and complexity and making the process more environmentally friendly. Using less or no solvent during the manufacturing process can also improve the mechanical strength of the ASSB cell. Dry electrospinning and electrospraying of the components used in each layer can be done without the use of any solvent. For example, the powdered components of the cathode layer 112 can be mixed. A base structure electrospun binder can be created, and the powdered components can be mixed with the electrospun binder and laminated. Alternatively, the powdered components can be electrosprayed onto the electrospun binder. Using a rotating drum, sequential layers can be formed on the rotating drum with electrospinning and electrospraying to manufacture the ASSB cell.

The embodiments of the ASSB cells disclosed herein may be configured, among other parts, with a thin metal cathode current collector, such as, for instance, 10 μm aluminum foil, carbon paper or graphene paper (or no such current collector if the cathode is conductive enough along its outside surface to which the positive terminal may be connected). An anode current collector can be included. As a non-limiting example, the anode current collector can be a sheet or foil of non-corrosive stainless steel. The elements of the solid-state battery cell may be, for example, packaged using a thin-film encapsulation of about 3 μm in thickness. An all-solid-state battery can have one or more all-solid-state battery cells.

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An all-solid-state battery cell, comprising:
a lithium metal anode layer;
an anode protective layer in contact with the lithium metal anode layer, the anode protective layer comprising at least one metal;
a first electrolyte layer in contact with the anode protective layer;
a second electrolyte layer;
an electrolyte interlayer consisting of carbon and binder, the electrolyte interlayer positioned directly between the first electrolyte layer and the second electrolyte layer; and
a cathode layer in contact with the second electrolyte layer.

2. The all-solid-state battery cell of claim 1, wherein the anode protective layer consists of electrospun polymer and the metal is metal particles dispersed in the electrospun polymer.

3. The all-solid-state battery cell of claim 2, wherein the metal particles are nanoparticles of one or more of Ag, AgCu, Au, Pt, PtNi, Pd, PdNi, $PtCu_3$, $PdCu_3Ni$, AuCu, Ni, and NiCu.

4. The all-solid-state battery cell of claim 1, wherein the anode protective layer comprises one or more MXene materials and the metal is one or more of Ti, V, Cr and Nb.

5. The all-solid-state battery cell of claim 1, wherein the anode protective layer comprises carbon and the metal is metal particles dispersed through the carbon.

6. The all-solid-state battery cell of claim 5, wherein the carbon is one or more of carbon nanotubes, carbon fiber, and graphene nanotubes.

7. The all-solid-state battery cell of claim 5, wherein the metal particles are nanoparticles of one or more of Ag, AgCu, Au, Pt, PtNi, Pd, PdNi, $PtCu_3$, $PdCu_3Ni$, AuCu, Ni, and NiCu.

8. The all-solid-state battery cell of claim 1, wherein the carbon of the electrolyte interlayer is one or both of carbon nanotubes and carbon fibers.

9. The all-solid-state battery cell of claim 1, wherein the carbon of the electrolyte interlayer is carbon nanotubes aligned in a stacking direction between the first electrolyte layer and the second electrolyte layer.

10. The all-solid-state battery cell of claim 9, wherein the carbon nanotubes extend into or are embedded in the second electrolyte layer.

11. The all-solid-state battery cell of claim 1, wherein the first electrolyte layer has a greater thickness than a thickness of the second electrolyte layer.

12. The all-solid-state battery cell of claim 11, wherein a thickness of the first electrolyte layer is between 20 μm and 50 μm and the thickness of the second electrolyte layer is between 10 μm and 20 μm.

13. The all-solid-state battery cell of claim 1, wherein the first electrolyte layer is composed of a first solid electrolyte and the second electrolyte layer is composed of a second solid electrolyte of a different material than the first solid electrolyte.

14. The all-solid-state battery cell of claim 13, wherein the first solid electrolyte is an oxide-based electrolyte and the second solid electrolyte is a sulfide-based electrolyte.

15. An all-solid-state battery cell, comprising:
a lithium metal anode layer;
an anode protective layer in contact with the lithium metal anode layer, the anode protective layer comprising metal particles;
a first electrolyte layer in contact with the anode protective layer;
a second electrolyte layer;
an electrolyte interlayer comprising carbon nanotubes and binder, the carbon nanotubes aligned in a stacking direction, the electrolyte interlayer positioned directly between the first electrolyte layer and the second electrolyte layer; and
a cathode layer in contact with the second electrolyte layer, wherein the first electrolyte layer has a greater thickness than a thickness of the second electrolyte layer.

16. The all-solid-state battery cell of claim 15, wherein anode protective layer further comprises polymer or carbon and the metal particles are nanoparticles of one or more of Ag, AgCu, Au, Pt, PtNi, Pd, PdNi, $PtCu_3$, $PdCu_3Ni$, AuCu, Ni, and NiCu dispersed in the polymer or the carbon.

17. The all-solid-state battery cell of claim 15, wherein the anode protective layer comprises one or more MXene materials and the metal particles are one or more of Ti, V, Cr and Nb.

18. The all-solid-state battery cell of claim 15, wherein the first electrolyte layer is composed of a first solid electrolyte and the second electrolyte layer is composed of a second solid electrolyte of a different material than the first solid electrolyte.

19. The all-solid-state battery cell of claim 18, wherein the first solid electrolyte is an oxide-based electrolyte and the second solid electrolyte is a sulfide-based electrolyte.

20. The all-solid-state battery cell of claim 15, wherein the carbon nanotubes extend into or are embedded in the second electrolyte layer.

* * * * *